United States Patent Office 2,794,049
Patented May 28, 1957

2,794,049

DITHIA-DIOXO-HYDROCARBONS

Ralph B. Thompson, Hinsdale, Ill., assignor to Universal Oil Products Company, Des Plaines, Ill., a corporation of Delaware No Drawing. Application November 17, 1953, Serial No. 392,737

10 Claims. (Cl. 260—586)

This application is a continuation-in-part of my copending application Serial No. 175,018, filed July 20, 1950, now abandoned, and relates to novel compositions of matter.

The novel compositions of matter comprise certain dithia-diketones in which the keto and sulfur groups are in a specific relation to each other.

In a specific embodiment the present invention relates to a novel composition of matter comprising a 4,5-dithia-1,8-diketone.

In a more specific embodiment the present invention relates to a novel composition of matter comprising 5,6-dithia-2,9-diketodecane.

In still another specific embodiment the present invention relates to a novel composition of matter comprising 5,6-dithia-4,4,7,7-tetramethyl-2,9-diketodecane.

The novel compositions of matter may be illustrated by the following general formula:

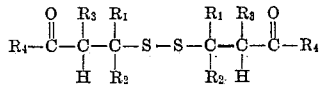

wherein each of $R_1$, $R_2$, $R_3$ and $R_4$ is separately and independently selected from the members of the groups consisting of hydrogen, hydrocarbon, substituted hydrocarbon, heterocyclic and substituted heterocyclic groups. The hydrocarbon group preferably is selected from alkyl, alkenyl, cycloalkyl, cycloalkalkyl, alkcycloalkyl, aryl, alkaryl and aralkyl. The substituted groups may contain such radicals as hydroxyl amino, monoalkylamino, dialkylamino, etc.

In another form of the invention, $R_1$ and $R_4$ may comprise carbon atoms forming a polymethylene ring.

It will be noted from the general formula hereinbefore set forth that the keto groups are attached to carbon atoms in positions beta to the sulfur atoms and that the sulfur atoms are attached to each other. This specific configuration is present in all of the novel compositions of the present invention and is essential thereto. These compounds are useful as antioxidants in retarding oxidative deterioration of organic compounds, including edible fats and oil, motor fuels and particularly cracked gasoline, polymer gasoline, etc., diesel oil, mineral oil, lubricating oil, fuel oil, drying oil, greases, rubber, etc. These compounds also may find utility as intermediates in various organic synthesis.

The novel compounds of the present invention may be prepared in any suitable manner. In a preferred method these compounds are prepared by reacting an alpha-beta-unsaturated carbonyl compound; namely, an alpha-beta-unsaturated ketone or an alpha-beta-unsaturated aldehyde, with hydrogen sulfide to form a mercapto-carbonyl compound, which then is oxidized to the dithia-diketo compound.

The carbonyl compounds used as starting materials in the present process include both aldehydes and ketones which may be represented by the formula:

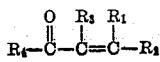

wherein $R_1$, $R_2$, $R_3$ and $R_4$ each separately and independently represents a member of the groups consisting of hydrogen, hydrocarbon, and heterocyclic groups. The hydrocarbon groups which are represented by $R_1$, $R_2$, $R_3$ and $R_4$ include alkyl, alkenyl, cycloalkyl, cycloalkalkyl, alkcycloalkyl, aryl, alkaryl and aralkyl groups. The heterocyclic rings which are represented also by $R_1$ to $R_4$ include a thiophene ring, a furan ring, a pyridine ring, etc. In general, alpha-beta-unsaturated ketones are preferred and particularly those in which $R_4$ represents a hydrocarbon group, and each of $R_1$, $R_2$ and $R_3$ represents a hydrogen atom, or $R_1$ and $R_3$ represent hydrogen atoms and $R_2$ represents a hydrocarbon group, particularly an alkyl group.

The reaction of hydrogen sulfide with an alpha-beta-unsaturated ketone is effected readily by contacting these reacting materials using a large excess of hydrogen sulfide generally at a temperature of from about 0° to about 100° C. and preferably in the presence of a basic catalyst. Ketones containing at least one hydrogen atom combined with the carbon atom in beta position to the keto group react readily with hydrogen sulfide in the presence of a basic catalyst such as piperidine, sodium methylate, quaternary ammonium hydroxides, and other basic catalysts. In some cases, it is desirable to heat the reaction mixture at a temperature of from about 50° to about 100° C. in order to promote the reaction. In most cases it is necessary to use a large excess of hydrogen sulfide to avoid formation of the thiaketones wherein one molecule of hydrogen sulfide is combined with two molecules of alpha-beta-unsaturated ketone.

The mercapto-carbonyl compounds and particularly mercapto-ketones, which are formed by reacting hydrogen sulfide with an alpha-beta-unsaturated carbonyl compound, are converted into dithia-1,8-diketones by an oxidation treatment, such as by blowing air or another oxygen-containing gas through the liquid mercapto-carbonyl compound, particularly mercapto-ketone, at a temperature of from about 20° to about 100° C.

In this step of the process mild oxidizing agents as peroxides, etc. also may be utilized to bring about the oxidative condensation of two molecules of the mercapto-carbonyl compound to form one molecule of a dithia-1,8-diketone.

The following preparations are illustrative of the large number of compounds which may be prepared and used within the scope of the present invention. It is understood that all of these compounds are not necessarily of equivalent activity for all uses. These compounds are prepared in accordance with the general procedure hereinbefore set forth.

The following specific compounds comprise those in which $R_1$, $R_2$ and $R_3$ are hydrogen and $R_4$ is an alkyl group. 5,6 - dithia - 2,9 - diketodecane is prepared by the reaction of methyl vinyl ketone with hydrogen sulfide to form methyl beta-mercaptoethyl ketone, followed by oxidative condensation. 6,7 - dithia - 3,10 - diketodecane is prepared by the reaction of ethyl vinyl ketone with hydrogen sulfide to form ethyl beta-mercaptoethyl ketone and then oxidative condensation thereof. 7,8-dithia - 4,11 - diketotetradecane is prepared by the reaction of propyl vinyl ketone with hydrogen sulfide to form propyl beta-mercaptoethyl ketone which is then oxidatively condensed. 8,9-dithia-5,12-diketohexadecane is prepared by the reaction of butyl vinyl ketone with hydrogen sufide to form butyl beta-mercaptoethyl ketone which subsequently is oxidatively condensed. Similarly, dithia-diketooctadecane, dithia - diketoeicosane, dithia-diketodocosane, dithia - diketotetracosane, etc., may be prepared by utilizing, as starting material, amyl vinyl ketone, hexyl vinyl ketone, heptyl vinyl ketone, octyl vinyl ketone, etc.

As illustrative of compounds in which $R_1$, $R_2$ and $R_4$ in the above general formula are alkyl groups, 5,6-dithia-4,4,7,7 - tetramethyl - 2,9 - ketodecane is prepared by the reaction of mesityl oxide with hydrogen sulfide, followed by oxidative condensation of the intermediate product. Similarly, 5,6 - dithia - 4,7 - dimethyl - 4,7 - diethyl - 2,9-diketodecane is prepared by the reaction of methyl (methylethylvinyl) ketone with hydrogen sulfide, followed by oxidative condensation of the intermediate product.

As illustrative of compounds in which $R_4$ comprises an alkenyl radical, 7,8 - dithia - 4,11 - diketotetradecadiene-1,13 may be prepared by the reaction of allyl vinyl ketone with hydrogen sulfide and subsequent oxidative condensation of the intermediate product. Similarly, 7,8-dithia-2,13 - dimethyl - 4,11 - diketotetradecadiene - 1,13 may be prepared by the reaction of methallyl vinyl ketone with hydrogen sulfide, followed by oxidative condensation. Still further, 8,9 - dithia - 5,12 - diketohexadecadiene-2,14 may be prepared by the reaction of crotyl vinyl ketone with hydrogen sulfide and oxidative condensation of the intermediate product.

As representative of compounds in which $R_4$ is a cycloalkyl radical, 4,5 - dithia - 1,8 - dicyclohexyl - 1,8 - diketooctane may be prepared by the reaction of cyclohexyl vinyl ketone with hydrogen sulfide, followed by oxidative condensation. A compound containing an alkcycloalkyl radical may be prepared by the reaction of ethylcyclohexyl vinyl ketone with hydrogen sulfide and oxidative condensation of the intermediate product to form 4,5 - dithia - 1,8 - di - (ethyl - cyclohexyl) - 1,8-diketooctane.

As illustrative of compounds containing aryl groups, 4,5 - dithia - 1,8 - diphenyl - 1,8-diketooctane may be prepared by the reaction of phenyl vinyl ketone with hydrogen sulfide to form phenyl beta-mercaptoethyl ketone, followed by oxidative condensation thereof. Similarly, 4,5 - dithia - 1,8 - dinaphthyl - 1,8 - diketooctane may be prepared by the reaction of naphthyl vinyl ketone with hydrogen sulfide and oxidative condensation of the intermediate product. Illustrative compounds in which $R_1$ and $R_4$ are phenyl radicals, 4,5 - dithia - 1,3,6,8 - tetraphenyl - 1,8 - diketooctane may be prepared by the reaction of benzalacetophenone with hydrogen sulfide and oxidative condensation thereof. Illustrative of compounds containing both alkyl and phenyl radicals ($R_1$ being phenyl and $R_4$ being alkyl), 5,6-dithia-4,7-diphenyl-2,9-diketodecane may be prepared by the reaction of benzalacetone with hydrogen sulfide, followed by oxidative condensation. In 4,5-dithia-1,3,6,8-tetraphenyl-3,6-dimethyl-1,8-diketooctane, $R_1$ is alkyl radical and $R_2$ and $R_4$ are phenyl groups. This compound is prepared by the reaction of dypnone with hydrogen sulfide, followed by oxidative condensation of the intermediate product. Compounds containing alkaryl groups are illustrated by 4,5 - dithia - 1,8 - ditolyl - 1,8 - diketooctane, which may be prepared by the reaction of tolyl vinyl ketone with hydrogen sulfide and oxidative condensation of the intermediate product, and by 4,5-dithia-1,8-dixylyl-1,8-diketooctane which may be prepared by the reaction of xylyl vinyl ketone with hydrogen sulfide, followed by oxidative condensation.

As illustrative of compounds containing heterocyclic groups, 4,5 - dithia - 3,6 - diphenyl - 1,8 - difuryl - 1,8-diketooctane may be prepared by the reaction of benzalacetofurane with hydrogen sulfide and oxidative condensation of the intermediate product. As illustrative of compounds in which $R_1$ and $R_4$ comprise carbon atoms forming a polymethylene ring, bis-(3-ketocyclohexyl)-disulfide may be prepared by the reaction of cyclohexenone-2 with hydrogen sufide and oxidative condensation.

While the ketones generally are preferred as reactants, it is understood that the aldehydes may be used in preparing the novel compounds of the present invention. Thus, 4,5-dithiaoctane-1,8-dial may be prepared by the reaction of acrolein with hydrogen sulfide and oxidative condensation of the intermediate product, and 4,5-dithia-3,6 dimethyloctane - 1,8 - dial may be prepared by the reaction of crotonaldehyde with hydrogen sulfide and subsequent oxidative condensation. Similarly, 4,5-dithia-3,6-diphenyloctane-1,8-dial may be prepared by the reaction of cinnamaldehyde with hydrogen sulfide and oxidative condensation of the intermediate product. Other compounds may be prepared by starting with different alpha-beta unsaturated aldehydes.

The following examples are introduced to illustrate further the novelty and utility of the present invention but not with the intention of unduly limiting the same.

*Example I*

5,6-dithia-2,9-diketodecane was prepared by reacting methyl vinyl ketone with hydrogen sulfide to form methyl beta-mercaptoethyl ketone which was then oxidized with hydrogen peroxide to form 5,6-dithia-2,9-diketodecane.

*Example II*

In order to show the inhibitor potency of the dithia-diketodecane, prepared in accordance with Example I, 0.02% by weight of this compound was added to lard which had a normal stability period of 5 hours. The lard so inhibited had a stability period of 17 hours. The stability period of the lard was determined by the Swift test, which is described in detail in the article by A. E. King, H. L. Roschen, and W. H. Irwin, in the Oil and Soap, vol. X, No. 6, pages 106–109 (1933), and modified as described in the article by R. W. Reimenschneider, J. Turer and R. M. Spec, which appeared in the Oil and Soap, pages 169, 171, September 1943. In general, the test comprises bubbling air through a sample of the lard until rancidity is determined organoleptically and by peroxide value, the lard being limited to a peroxide number of 20.

*Example III*

5,6-dithia-4,4,7,7-tetramethyl-2,9-diketodecane was prepared by reacting mesityl oxide with hydrogen sulfide and oxidative condensation of the product. Mesityl oxide was reacted with hydrogen sulfide specifically as follows: To mesityl oxide (504 g.) was added 1 g. of 40% sodium methylate in methanol, and hydrogen sulfide was passed into the mixture with rapid stirring. The excess of hydrogen sulfide is not necessary here as the two methyl groups on the $\beta$-carbon atom hinder formation of the thiadiketone. While the hydrogen sulfide was being added, a total of 4.5 g. additional sodium methylate was added. After the addition of 122 g. of hydrogen sulfide, the reaction mixture was washed twice with very dilute sulfuric acid and once with water. The product was distilled in vacuum to yield 349 g. of 2-methyl-2-mercapto-4-pentanone, a yield of 74% based on the hydrogen sulfide.

*Analysis.*—Calculated for $C_6H_{12}OS$: 24.2% S. Found: 24.0% S.

30% hydrogen peroxide (100 g.) was added with vigorous stirring to 220 g. of the 2-methyl-2-mercapto-4-pentanone, prepared in the above manner, and 100 cc. of glacial acetic acid. The reaction mixture was cooled sufficiently to hold the temperature between 85–95° C. The mixture was diluted with water and extracted with a hydrocarbon solvent, the solvent subsequently being removed by vacuum distillation. A portion of the product was distilled at 0.7 mm., boiling point 137–142° C.

*Analysis.*—Calculated for $C_{12}H_{22}O_2S_2$: 24.4% S. Found: 24.4% S.

*Example IV*

4,5-dithia-3,6-dimethyloctane-1,8-dial is prepared by reacting crotonaldehyde with hydrogen sulfide, separating the resultant mercaptoaldehyde, and oxidatively condensing it with hydrogen peroxide.

I claim as my invention:

1. A dithia-dioxo-hydrocarbon having the following general formula:

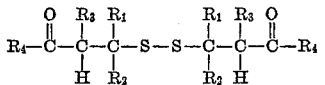

wherein each of $R_1$, $R_2$, $R_3$ and $R_4$ is separately and independently selected from the group consisting of hydrogen and hydrocarbon radicals.

2. A 4,5-dithia-1,8-diketooctane which is free of non-hydrocarbon substituents.

3. A 4,5-dithia-1,8-diaryl-1,8-diketooctane which is free of non-hydrocarbon substituents.

4. 4,5-dithia-1,8-diphenyl-1,8-diketooctane.

5. A 4,5-dithia-1,8-dicycloalkyl-1,8-diketooctane which is free of non-hydrocarbon substituents.

6. 4,5-dithia-1-8-dicyclohexyl-1,8-diketooctane.

7. 4,5-dithia-1,8-ditolyl-1,8-diketooctane.

8. A 5,6-dithia-2,9-diketodecane which is free of non-hydrocarbon substituents.

9. 5,6-dithia-2,9-diketodecane.

10. 5,6-dithia-4,4,7,7-tetramethyl-2,9-diketodecane.

References Cited in the file of this patent

UNITED STATES PATENTS

| | | |
|---|---|---|
| 1,908,935 | Tschunkur et al. | May 16, 1933 |
| 2,010,828 | Rothrock | Aug. 13, 1935 |
| 2,028,246 | Rider et al. | Jan. 21, 1936 |
| 2,212,150 | Burke | Aug. 20, 1940 |
| 2,492,235 | Chenicek et al. | Dec. 27, 1949 |
| 2,492,336 | Thompson et al. | Dec. 27, 1949 |